(12) United States Patent
Ro et al.

(10) Patent No.: US 9,414,423 B2
(45) Date of Patent: Aug. 9, 2016

(54) SCRAMBLING SEQUENCE GENERATION METHOD AND APPARATUS FOR USE IN DEVICE-TO-DEVICE COMMUNICATION

(71) Applicant: Samsung Electronics Co., Ltd., Gyeonggi-do (KR)

(72) Inventors: Sangmin Ro, Seoul (KR); Yongjun Kwak, Gyeonggi-do (KR); Juho Lee, Gyeonggi-do (KR); Joonyoung Cho, Gyeonggi-do (KR); Hyoungju Ji, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 165 days.

(21) Appl. No.: 14/182,891

(22) Filed: Feb. 18, 2014

(65) Prior Publication Data
US 2014/0233475 A1    Aug. 21, 2014

(30) Foreign Application Priority Data

Feb. 15, 2013  (KR) .................. 10-2013-0016540
Sep. 26, 2013  (KR) .................. 10-2013-0114445
Jan. 29, 2014  (KR) .................. 10-2014-0011671

(51) Int. Cl.
| H04W 76/02 | (2009.01) |
| H04W 4/00 | (2009.01) |
| H04W 56/00 | (2009.01) |
| H04W 8/00 | (2009.01) |
| H04W 8/26 | (2009.01) |
| H04L 25/03 | (2006.01) |

(52) U.S. Cl.
CPC ....... *H04W 76/023* (2013.01); *H04L 25/03866* (2013.01); *H04W 4/008* (2013.01); *H04W 8/005* (2013.01); *H04W 8/26* (2013.01); *H04W 56/0025* (2013.01)

(58) Field of Classification Search
CPC .......... H04L 25/03866; H04W 4/008; H04W 56/0025; H04W 8/005; H04W 8/26; H04W 76/023
See application file for complete search history.

(56) References Cited

U.S. PATENT DOCUMENTS

| 2011/0268101 | A1 | 11/2011 | Wang et al. | |
| 2013/0003639 | A1* | 1/2013 | Noh | H04L 5/0053 370/312 |
| 2013/0034064 | A1 | 2/2013 | Nam et al. | |
| 2013/0148538 | A1* | 6/2013 | Ohwatari | H04B 7/0865 370/252 |
| 2014/0105150 | A1* | 4/2014 | Kim | H04B 7/0417 370/329 |
| 2014/0120934 | A1 | 5/2014 | Kishiyama | |
| 2014/0169327 | A1* | 6/2014 | Chun | H04W 56/0015 370/330 |
| 2014/0211730 | A1* | 7/2014 | Seo | H04L 5/0053 370/329 |
| 2015/0036604 | A1* | 2/2015 | Park | H04L 5/0037 370/329 |

FOREIGN PATENT DOCUMENTS

WO    WO 2013/002206    1/2013

OTHER PUBLICATIONS

Ericsson, "On Scrambling of D2D Physical Channels", R1-140777, 3GPP TSG RAN WG1 Meeting #76, Feb. 10-14, 2014.

* cited by examiner

*Primary Examiner* — Jianye Wu
(74) *Attorney, Agent, or Firm* — The Farrell Law Firm, P.C.

(57) ABSTRACT

A scrambling sequence generation method and apparatus of a device supporting Device-to-Device communication are provided. The method includes acquiring at least one of an identifier of the device, an identifier of a counterpart device and a preconfigured value; determining an initial value of the scrambling sequence for the Device-to-Device communication based on the at least one of the identifier of the device, the identifier of the counterpart device, and the preconfigured value; and generating the scrambling sequence using the initial value.

20 Claims, 10 Drawing Sheets

SCRAMBLING SEQUENCE GENERATION METHOD AND APPARATUS FOR USE IN DEVICE-TO-DEVICE COMMUNICATION

PRIORITY

This application claims priority under 35 U.S.C. §119(a) to Korean Patent Application Nos. 10-2013-0016540, 10-2013-0114445, and 10-2014-0011671, which were filed in the Korean Intellectual Property Office on Feb. 15, 2013, Sep. 26, 2013, and Jan. 29, 2014, respectively, the entire content of each of which is incorporated herein by reference.

BACKGROUND OF THE INVENTION

1. Field of the Invention

The present invention relates generally to a scrambling sequence generation method for use in device-to-device communication and, more particularly, to a method and apparatus for generating a scrambling sequence based on an initial value determined as a function of at least one of a transmission device identifier, a reception device identifier, and a preconfigured value.

2. Description of the Related Art

In typical data communication, a transmission device scrambles a bit block of data to be transmitted with a scrambling sequence, modulates the scrambled bit block to generate a modulated signal, and transmits the modulated signal to a reception device. The reception device demodulates the received signal into the data bit block and descrambles the data bit block with the same scrambling sequence used by the transmission device. The scrambling process is provided to randomize the influence of an interference signal to the data bit block when the transmission device and the reception device share information necessary for generating the same scrambling sequence.

The $3^{rd}$ Generation Partnership Project (3GPP) is an asynchronous cellular mobile communication standard organization that specifies how to apply scrambling to the data bit block transmitted on downlink and uplink data channels in Long Term Evolution (LTE), as one of the next generation communication systems. According to LTE standard, the scrambling sequence is the Gold sequence with a length of 31, which is generated from two m-sequences having different generation polynomials. The initial value of one of the two m-sequences is defined in the LTE standard, and the initial value of the other one of the two m-sequences is determined according to the purpose of the physical channel to which the scrambling sequence is applied.

Recently, the 3GPP has discussed Device-to-Device (D2D) communication in LTE, in addition to legacy radio communication between a base station and a terminal. When the D2D communication is supported in LTE, it is possible to apply the above-described scrambling to obtain an interference randomization effect in communication between devices.

Since the legacy LTE standard supports only the wireless communication between a base station and a terminal, the scrambling is also designed for such a communication environment. More specifically, in the legacy LTE radio communication environment, since a base station and terminals located within the service area of the base station are the main nodes of data communication, it is easy for the base station and the terminals to share the information required for initializing the scrambling sequence.

When using D2D communication, however, the terminals or devices participating in data communications may be located within the service areas of different base stations, and a terminal or device may fail to receive service from a base station or leave the service area of the base station. In these circumstances, it is difficult to apply the scrambling applied according to the LTE standard, without modification. For example, if the terminals or devices are located in service areas of different base stations, there is an increase of signaling overhead for sharing the information for use in scrambling sequence generation with their serving base stations. Also, when a terminal or device cannot be served by a base station, it is impossible to perform scrambling with the base station-concerned information.

Therefore, there is a need of a method for generating a scrambling sequence suitable for the D2D communication environment distinct from the base station-terminal communication environment.

SUMMARY OF THE INVENTION

The present invention has been made to address at least the above-described problems and/or disadvantages, and to provide at least the advantages described below.

Accordingly, an aspect of the present invention provides a scrambling sequence generation method and apparatus for generating scrambling sequence based on the initial value determined as the function of at least one of a transmission device identifier, a reception device identifier, and a preset value.

Another aspect of the present invention provides a scrambling sequence generation method and apparatus for generating a scrambling sequence using a generation function of an initial value suitable for 1:1 and 1:N D2D communications.

According to an aspect of the present invention, a scrambling sequence generation method of a device supporting Device-to-Device communication is provided. The scrambling sequence generation method includes acquiring at least one of an identifier of the device, an identifier of a counterpart device and a preconfigured value, determining an initial value of the scrambling sequence for the Device-to-Device communication based on the at least one of the identifier of the device, the identifier of the counterpart device and the preconfigured value, and generating the scrambling sequence using the initial value.

According to another aspect of the present invention, a device for generating a scrambling sequence for use in Device-to-Device communication is provided. The device includes an initializer which determines an initial value of the scrambling sequence based on at least one of an identifier of the device, an identifier of a counterpart device and a preconfigured value, a scrambling sequence generator which generates the scrambling sequence for used in the device-to-device communication based on the initial value and a calculator which scrambles data using the scrambling sequence.

According to another aspect of the present invention, a device for generating a scrambling sequence for use in Device-to-Device communication is provided. The device includes an initializer configured to determine an initial value of the scrambling sequence based on at least one of an identifier of the device, an identifier of a counterpart device and a preconfigured value; a scrambling sequence generator configured to generate the scrambling sequence for used in the device-to-device communication based on the initial value; and a calculator configured to scramble data using the scrambling sequence.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
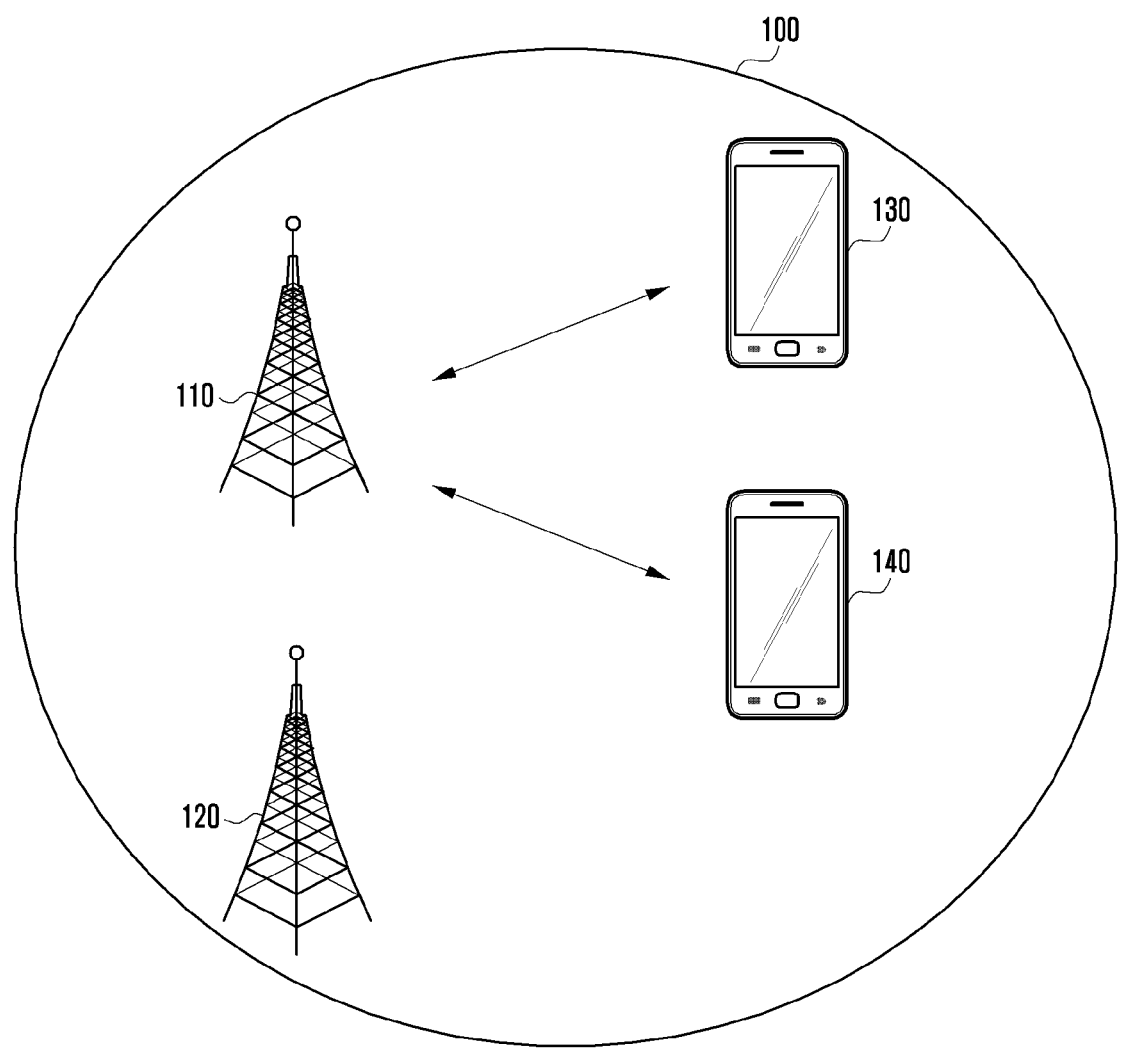
FIG. 1 is a schematic diagram illustrating a wireless communication system according to an embodiment of the present invention.

Hereinafter, various embodiments of the present invention will be described with reference to the accompanying drawings. In the following description, a detailed description of known functions and configurations incorporated herein will be omitted when it may make the subject matter of the present invention rather unclear. Further, in the following description of the present invention, various specific definitions are provided only to help general understanding of the present invention, and it is apparent to those skilled in the art that the present invention can be implemented without such definitions.

Embodiments of the present invention may be applied to initializing and generating a scramble sequence of a terminal performing D2D communication.

Embodiments of the present invention are applicable to various radio communication systems such as Code Division Multiple Access (CDMA) system, Time Division Multiple Access (TDMA) system, Frequency Division Multiple Access (FDMA) system, Orthogonal Frequency Division Multiple Access (OFDMA) system, and Single Carrier FDMA (SC-FDMA) system. Herein, the terms "system" and "network" may be used interchangeably. The CDMA system may be implemented with radio technologies such as Universal Terrestrial Radio Access (UTRA) and CDMA2000. The UTRA technology includes Wideband CDMA (WCDMA) and other alternative forms of CDMA. The CDMA2000 includes International Standard (IS)-2000, IS-95, and IS-856 standards. The TDMA system may be implemented with a radio technology such as Global System for Mobile communications (GSM). The OFDMA system may be implemented with a radio technology such as Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, and Flash Orthogonal Frequency Division Multiplexing (OFDM). The UTRA and E-UTRA technologies are parts of the Universal Mobile Telecommunications System (UMTS). The 3GPP LTE is a next generation UMTS release that adopts OFDMA in downlink and adopts SC-FDMA in uplink. Such wireless communication systems may include peer-to-peer (e.g., mobile-to-mobile) ad hoc network systems using unpaired unlicensed spectrums, 802.xx Wireless Local Area Network (WLAN), Bluetooth, and other short and long distance radio communication technologies.

Embodiments of the present invention are described herein with reference to terminals. Herein, a terminal may refers, for example, any of a system, subscriber unit, subscriber station, mobile station, mobile, remote station, remote terminal, mobile device, user device, node, radio communication device, user agent, user device, or User Equipment (UE). The terminal may be, for example, a cellular phone, a Personal Digital Assistant (PDA), a radio access-capable handheld device, a computing device, or a processing device connected to a wireless modem.

Embodiments of the present invention are also described herein with reference to a base station. Herein, a base station refers to an Access Point, node B, evolved Node B (e Node B or eNB), etc.

The terms "component", "system", and "module" used in the following description may indicate a computer-related entity, hardware, firmware, a combination of hardware and software, software, and/or execution software. For example, a component may be a process executed by a processor, a process, an object, an execution file, an execution thread, a program, and/or a computer, without limit thereto. One or more components may reside in a process and/or execution thread, and a single component may be localized in a single computer or distributed to two or more computers. Such components may be executed from various computer-readable media storing data in various data structures. The components may communicate by local and/or remote processes according to the signal having one or more data packets (e.g., data from a component interacting with other components in a local system or a distributed system and/or data from a component interacting with other systems through a network such as Internet).

Various aspects and features described with respect to embodiments of the present invention may be implemented in a method, apparatus, or article of manufacture using programming and/or engineering technologies. Here, the term "manufactured product" may refer to any of a computer program accessible by a computer-readable device, carrier, and media. For example, the computer-readable media may include any of a magnetic storage device (e.g. hard disk, floppy disk, and magnetic stripe), optical disk (e.g. Compact Disk (CD) and digital versatile disk (DVD)), smart card, and flash memory device (e.g. EPROM, card, stick, and key drive), without limit thereto.

As used herein, the singular forms "a", "an", and "the" are intended to include the plural forms as well, unless the context indicates otherwise. The terms "comprises" "comprising," "includes" and/or "including" when used herein, specify the presence of stated features, integers, steps, operations, elements, and/or components, but do not preclude the presence or addition of other features, steps, operations, elements, components, and/or groups thereof.

Embodiments of the present invention are described as follows with reference to the accompanying drawings in detail.

According to an embodiment of the present invention, an identifier proposed for determining a scrambling sequence may be used for a certain purpose other than generating the scrambling sequence. At least one of the identifiers according to embodiments of the present invention may be used as an input variable of a Demodulation Reference Signal (DMRS) sequence generation function for use in demodulation of data, a sequence (e.g., a preamble for searching for an available resource) generation function for use in D2D communication access process, and a sequence (e.g., sounding sequence) generation function for use in channel status measurement.

FIG. 1 is a schematic diagram illustrating a wireless communication system to which embodiments of the present invention are applied. As shown in FIG. 1, a wireless communication system 100 includes base stations 110 and 120. Each of the base stations 110 and 120 includes at least one antenna. Each of the base stations 110 and 120 may further include (not shown) a processor, a modulator, a multiplexer, a demodulator, a demultiplexer, etc.

Each of the base stations 110 and 120 is able to communicate with at least one of the first and second terminals 130 and 140. Each of the first and second terminals 130 and 140 is a device capable of communicating with the wireless communication system 100, such as a cellular phone, smartphone, laptop computer, mobile communication device, mobile computing device, Personal Digital Assistant (PDA), and desktop Personal Computer (PC).

In the wireless communication system 100, the first and second terminal 130 and 140 are capable of D2D communication. The first and second terminals 130 and 140 are capable of performing cellular network-based D2D communication using the information transmitted by the base station or direct D2D communication without assistance from an infrastructure such as a base station.

The first and second terminals 130 and 140 perform device discovery for D2D communication. The first and second terminals 130 and 140 broadcast discovery signals in order for other terminals to discover them, and the first and second terminals 130 and 140 receive the discovery signals transmitted by other terminals in order to recognize the presence of these other terminals within a predetermined range. The first and second terminals 130 and 140 provide the peer terminals with the information including their identifiers through the discovery signals.

The first and second terminals 130 and 140 transmit/receive during a predetermined period through synchronization process in the state in which time synchronization is acquired. The synchronization is performed to minimize power consumption in monitoring the discovery signals broadcast by other terminals. At least one of the first and second terminals 130 and 140 transmits the synchronization signal to a peer terminal to acquire synchronization. At least one of the first and second terminals 130 and 140 also acquires synchronization using the synchronization signal received from the base station.

Although, according to the present example, the first and second terminals 130 and 140 are within the service area of the same base station 110, the first and second terminals 130 and 140 may perform communication within different service areas of different base stations. For example, at least one of the first and second terminals 130 and 140 may go outside of the service area or stay within the service area without communicating with the base station.

According to an embodiment of the present invention, the first and second terminals 130 and 140 may scramble data to be transmitted. For example, when the first terminal 130 operates as the transmission device and the second terminal 140 operates as the reception device, the first terminal 130 scrambles the transmission data using a scrambling sequence and the second terminal 140 descrambles the received data using the same scrambling sequence used by the first terminal 130. At this time, the first and second terminals 130 and 140 perform D2D communication through a unicast mode (i.e., a 1:1 mode) or a multicast mode.

According to an embodiment of the present invention, the scrambling sequences used by the first and second terminals 130 and 140 may be generated based on an initial value determined as the function of at least one of the identifier of the first terminal 130, the identifier of the second terminal 140 and a preset value. The scrambling sequence may also be generated based on the initial value determined as the function of the identifier of the transmitter of a synchronization signal (e.g., an identifier of the transmission device, reception device, or base station), the identifier of the transmitter transmitting multicast data, or the identifier predefined for multicast data transmission.

The information used in determining the initial value of the scrambling sequence may be received from the first base station 110 or the second base station 120. The information used in determining the initial value of the scrambling sequence may be exchanged between the first and second terminals 130 and 140 in synchronization or in a discovery procedure.

Figure 2:
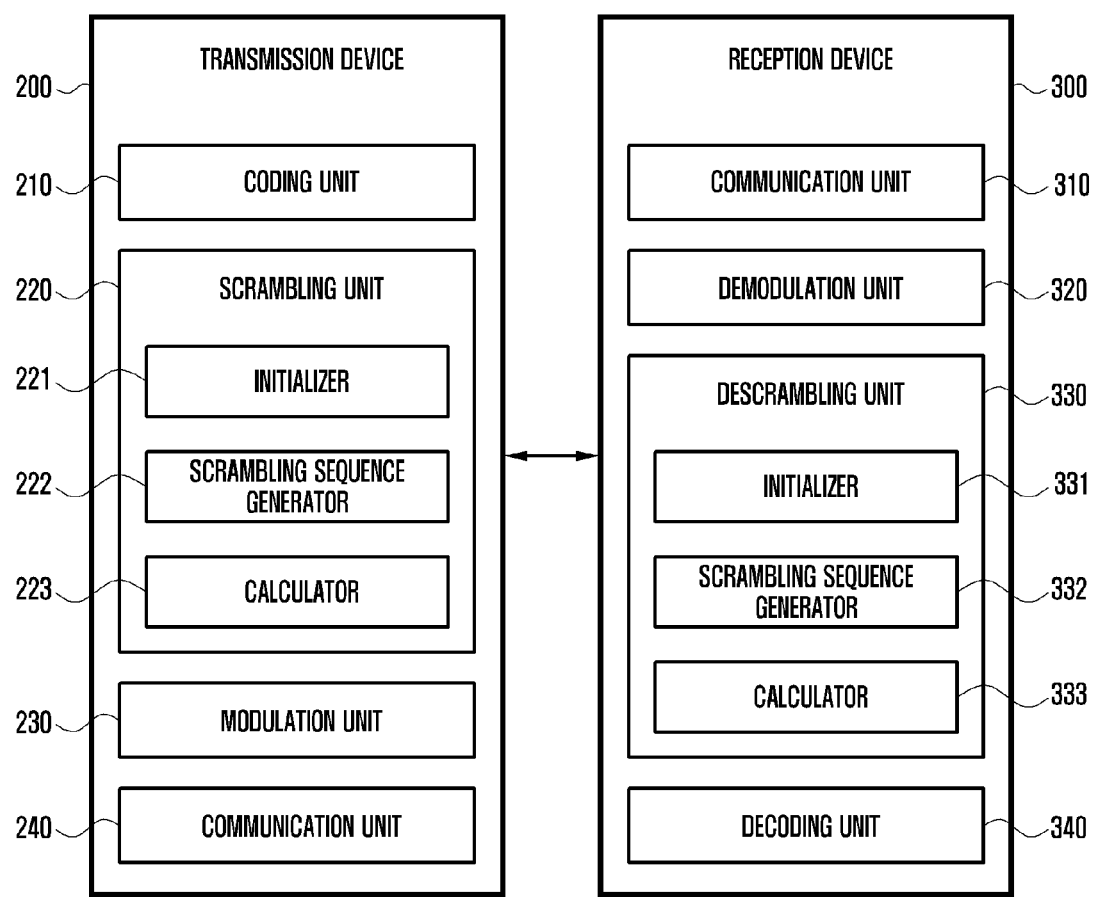
FIG. 2 is a diagram illustrating configurations of a transmission device and a reception device for generating a scrambling sequence in a wireless communication system according to an embodiment of the present invention.

FIG. 2 is a diagram illustrating configurations of a transmission device and a reception device for generating a scrambling sequence in a wireless communication system according to an embodiment of the present invention.

Referring to FIG. 2, the transmission and reception devices 200 and 300 transmit/receive data through D2D communication. Although, in the following example, the transmission device 200 transmits data to the reception device 300, the transmission device 200 may receive the data transmitted by the reception device 300. The transmission and reception devices 200 and 300 may be the first and second terminals 210 and 220 shown in FIG. 1.

The transmission device 200 includes a coding unit 210, a scrambling unit 220, a modulation unit 230, and a communication unit 240.

The coding unit 210 encodes data to be transmitted.

The scrambling unit 220 scrambles the encoded data. The scrambling unit 220 includes an initializer 221, a scrambling sequence generator 222, and a calculator 223.

The initializer 221 initializes the scrambling sequence used by the scrambling unit 220 at the start time of every subframe. According to an embodiment of the present invention, the initializer 221 determines the initial value of the scrambling sequence based on the identifier of the transmission device 200, the identifier of the reception device, or the value present for scrambling. The initializer 221 may determine the initial value of the scrambling sequence based on the identifier of the transmitter (e.g., an identifier of the transmission device 210, the reception device 300, or a base station) transmitting the synchronization signal, the identifier of the receiver transmitting multicast data, or an identifier predefined for a multicast data transmission. The initializer 221 may determine the initial value based on the variable such as index of time resource unit such as subframe and slot and/or a number of transmission data code blocks.

The scrambling sequence generator 222 generates a scrambling sequence based on the determined initial value. The scrambling sequence may be the Gold sequence with a length of 31, and may be generated from two m-sequences. However, embodiments of the present invention are not limited thereto but may be embodied with various types of scrambling sequences.

The calculator 223 scrambles the data by bit block. The calculator 223 scrambles the data by applying the scrambling sequence to the encoded data. More specifically, the calculator 223 performs an exclusive-or operation on the bit block and scrambling sequence to generate a scrambled bit block.

The modulator 230 converts the bit block scrambled by the scrambling unit 220 to the corresponding complex number modulation symbol.

The communication unit 240 sends, to the reception device 300, the modulation symbol generated by the modulator 230. The communication unit 240 may include a precoder (not shown) for precoding the complex number modulation symbols generated by the modulation unit 230 and a resource element mapper (not shown) for mapping the complex number modulation symbols to resource elements.

The reception apparatus 300 includes a communication unit 310, a demodulation unit 320, a descrambling unit 330, and a decoding unit 340.

The communication unit 310 receives data transmitted by the transmission device 200.

The demodulation unit 320 demodulates the received complex number modulation symbols to output demodulated blocks of scrambled bits.

The descrambling unit 330 descrambles the scrambled bit blocks output from the demodulation unit 320. The descrambling unit 330 includes an initializer 331, a scrambling sequence generator 332, and a calculator 333.

The initializer 331 initializes the scrambling sequence for use in the descrambling unit 330 at the start time of every subframe, and the initialization of the scrambling sequence is performed as described with respect to the scrambling unit 220 of the transmission device 200.

The scrambling sequence generator 332 generates a scrambling sequence based on the initial value determined by the initializer 311. The scrambling sequence generated by the scrambling sequence generator 332 may be identical to the scrambling sequence generated by the scrambling unit 220 of the transmission device 200.

The calculator 330 outputs the descrambled data through an exclusive-or operation on the demodulated bit block and the generated scrambling sequence.

The decoding unit 340 decodes the descrambled bit block to recover the data transmitted by the transmission device 213.

The initial value determination in the scrambling sequence initialization process performed by the scrambling unit 220 of the transmission device 200 or the scrambling unit 330 of the reception device 200 is described as follows.

First Embodiment

According to a first embodiment of the present invention, the initial value for generating a scrambling sequence is determined by using at least one conversion function based on the identifiers of each of the transmission and reception devices 200 and 300. The initial value may be determined by Equation (1) below:

$$C = f(N_{ID}^{TX}) + g(N_{ID}^{RX}) + h(K,K') \quad (1)$$

In Equation 1, C denotes the initial value of the transition register generating the scrambling sequence with the initial value of the scrambling sequence. $N_{ID}^{TX}$ and $N_{ID}^{RX}$ denote the identifiers of the transmission and reception devices 200 and 300.

The functions f(•) and g(•) are functions for converting the identifiers of the transmission and reception devices 200 and 300. According to an embodiment of the present invention, the functions f(•) and g(•) are used to convert the identifiers to values capable of being expressed with a certain number of bits, in order to prevent the identifiers of the transmission/reception terminals from being expressed with excess bits in D2D communication. More specifically, the functions f(•) and g(•) are functions for converting the numbers of bits of the identifiers of the transmission and reception devices 200 and 300 to certain number of bits according to a predetermined rule. If the conversion is performed to reduce the number of bits of the identifier, the number of bits of the entire scramble sequence is reduced, resulting in improvement of resource utilization efficiency.

According to an embodiment of the present invention, the functions f(•) and g(•) are defined according to Equations (2) and (3), as follows:

$$f(x) = x \bmod A \quad (2)$$

$$g(x) = x \bmod A' \quad (3)$$

In Equations (2) and (3), A and A' denote predetermined constants that may be set to the same value or different values.

According to another embodiment of the present invention, the functions f(•) and g(•) may be defined as functions that output the input values as they are. This may occur when the identifiers of the transmission and reception devices 200 and 300 are used as the initial values without any change the in number of bits.

The function H(•) is determined by an input value in addition to the identifiers of the transmission and reception devices 200 and 300. More specifically, the function H(•) may have a certain input variable for use in D2D communication.

According to an embodiment of the present invention, K and K' are used as the input variables shown in Equation (1). K may be a variable regarding spatial multiplexing, such as a number of transmission data code blocks. K' may be an index of the time resource units, such as subframe and slot. The function H(•) is not limited to the above description but may be an arbitrary function using at least one of various types of input values, in accordance with embodiments of the present invention.

According an embodiment of the present invention, assuming that the function f(•) converts the identifier to 16 bits, the function g(•) converts the identifier to 9 bits, the variable K is 1 bit, the K' is 4 bits; the number of bits required for expressing the initial value is 30 bits. In this case, the initial value obtained by Equation (1) may be expressed by Equations (4) and (5), as follows:

$$C = f(N_{ID}^{TX}) \cdot 2^{14} + K \cdot 2^{13} + K' \cdot 2^{9} + g(N_{ID}^{RX}) \quad (4)$$

$$C = f(N_{ID}^{RX}) \cdot 2^{14} + K \cdot 2^{13} + K' \cdot 2^{9} + g(N_{ID}^{TX}) \quad (5)$$

Here, Equation (4) shows the initial value when the identifier of the transmission device 200 is input to the function f(•) and the identifier of the reception device 300 is input to the function g(•). Equation (5) shows the initial value when the identifier of the transmission device 200 is input to the function g(•) and the identifier of the reception device 300 is input to the function f(•).

Each of the aforementioned input variables may have a number of bits different from those of Equations (4) and (5) and thus the equations may be modified according to the number of bits.

According to another embodiment of the present invention, the initial value may be configured to 30 bits for cellular data communication according to the above embodiment and a value longer than that for D2D data communication (e.g., 33 bits, of which 30 bits are arbitrary value distinct from the initial value for the cellular data communication and the remaining 3 bits are used to determine the different initial values of the scrambling sequence).

Second Embodiment

According to a second embodiment of the present invention, the initial value for generating a scrambling sequence is determined using at least one function based on the identifiers of the transmission and reception devices 200 and 300. More specifically, the initial value may be determined by Equation (6), as follows:

$$C = f(N_{ID}^{TX}, N_{ID}^{RX}) + h(K, K') \qquad (6)$$

In Equation (6), C denotes the initial value of the transition register generating the scrambling sequence with the initial value of the scrambling sequence. $N_{ID}^{TX}$ and $N_{ID}^{RX}$ denote the identifiers of the transmission and reception devices 200 and 300.

The function f(•) is an arbitrary function using the identifiers of the transmission and reception devices 200 and 300 as input variables.

According to an embodiment of the present invention, the function f(•) may be defined as Equation (7)

$$f(x, y) = (x + y) \bmod A \qquad (7)$$

Here, A denotes a predetermined constant.

According to an embodiment of the present invention, the initial value obtained by Equation (6) may be converted in order to improve the randomization feature by adding function g(•) of the identifiers of the transmission device 200 and/or reception device 300, as shown in Equations (8) and (9) below:

$$C = f(N_{ID}^{TX}, N_{ID}^{RX}) + h(K, K') + g(N_{ID}^{TX}) \qquad (8)$$

$$C = f(N_{ID}^{TX}, N_{ID}^{RX}) + h(K, K') + g(N_{ID}^{RX}) \qquad (9)$$

In Equations (8) and (9), the function g(•) may be the function defined by Equation (2). The function g(•) may be defined as a function for outputting the input value as-is.

Third Embodiment

According to a third embodiment of the present invention, the initial value for generating the scrambling sequence may be determined by using at least one function based on a predetermined value. More specifically, the initial value may be determined by Equation (10) below:

$$C = f(N_{ID}) + h(K, K') \qquad (10)$$

In Equation (10), NID denotes a predetermined value for determining initial value of the scrambling sequence. The functions f(•) and g(•) are the functions defined by Equation (2). The functions f(•) and g(•) may be defined as the functions for outputting the input values as-is.

The NID may be set to an arbitrary constant value. For example, the NID may be set to a value selected arbitrarily, except for the values allocated as the identifiers of at least one of the transmission and reception devices 200 and 300 or the identifier of the base station. For example, the identifiers of the transmission and reception devices 200 and 300 or the base station are selected in the range from 0 to 509 and, in the case of using 9 bits, the number of values that can be expressed with 9 bits are $2^9 = 512$. Accordingly, the NID may be set to an arbitrary value (e.g. 511=111111111) among the values from 504 to 511 remained by excluding the values from 0 to 503. At this time, the NID may be fixed to one of the values from 504 to 511 or selected randomly in the initialization process.

According to an embodiment of the present invention, the predetermined value may be configured by adding a certain number of bits to the number of bits of the value allocated for use as the identifier of the transmission device 200, the reception device 300, or the base station. The added bits may be used for indicating that the corresponding value is the value used for scrambling sequence initialization of D2D communication.

The NID may be transmitted to the transmission and reception devices 200 and 300 participated in the D2D communication after being determined cooperation of the base stations 110 and 120. At this time, the base station may transmit the determined NID to the transmission and reception devices 200 and 300 through Radio Resource Control (RRC) signaling. The NID also may be determined by the transmission and reception devices 200 and 300 and shared in discovery or scheduling procedure. When the NID is selected randomly, at least one of the transmission and reception terminals 200 and 300 may transmit the information on the NID value to the peer in NID sharing process. When the NID is selected from among eight values from 504 to 511 as described above, these values may be allocated indices from 0 to 7. At least one of the transmission and reception devices 200 and 300 may transmit a 3-bit binary index corresponding to the selected value to the counterpart device for sharing the NID.

According to an embodiment of the present invention, the function f(•) is defined according to Equation (11), below. More specifically, the function f(•) is defined as the function for setting NID to an arbitrary value among the values remained by excluding the values allocated for the identifier of the transmission device and/or the identifier of the reception device 300, and the identifier allocated as the cell ID of the base station according to the above-described embodiment of the present invention.

$$f(x) = (x \bmod m) + n \qquad (11)$$

In Equation (11), m denotes a number of values remaining after allocation of the identifier of the transmission device 200 or the reception device 300 or the cell ID of the base station from among all values that can be expressed with an arbitrary number of bits. Further, n denotes a number of values allocated as the identifier of the transmission device 200 or reception device 300 or the cell ID of the base station.

Equations (12) and (13) are derived by substituting m=8 and n=504 into Equation 11 as described above.

$$C = N_{ID}^{TX} \bmod 8 + 504 + h(K, K') \qquad (12)$$

$$C = N_{ID}^{RX} \bmod 8 + 504 + h(K, K') \qquad (13)$$

As described above, since the initial value is determined using the function of outputting one of the values remaining after allocation of the values for use as identifiers, there is no set of three extra bits for indicating which of remaining values is selected.

The modulo 8 operation may be implemented in such a way of selecting three bits of a bit string expressing the initial value as binary number and mapping it to one of 0 to 8 values. Such a modulo operation may be applied to other embodiments of the present invention in a similar manner.

According to an embodiment of the present invention, the initial value obtained by Equation (10) is modified into a form of improving the randomization characteristic by adding the function $g(\cdot)$ of the identifier of the transmission device 200 and/or the identifier of the reception device 300, such as according to Equations (14) or (15) below:

$$C=f(N_{ID})+h(K,K')+g(N_{ID}^{TX}) \quad (14)$$

$$C=f(N_{ID})+h(K,K')+g(N_{ID}^{RX}) \quad (15)$$

In Equations (14) and (15), the function $g(\cdot)$ may be defined according to Equation (2) above. The function $g(\cdot)$ also may be defined as a function that outputting the input value as-is.

When using Equation (14) or (15), Equations (12) and (13) are expressed as Equations (16) and (17) below:

$$C=N_{ID}^{TX} \bmod 8+504+h(K,K')+g(N_{ID}^{TX}) \quad (16)$$

$$C=N_{ID}^{RX} \bmod 8+504+h(K,K')+g(N_{ID}^{RX}) \quad (17)$$

Fourth Embodiment

According to a fourth embodiment of the present invention, the initial value for generating the scrambling sequence may be determined as the function of the identifier of the transmitter transmitting the synchronization signal for D2D communication. More specifically, the initial value is determined by Equation (18) or (19) below.

$$C=f(N_{ID}^{Sync\_TX})+h(K,K')+g(N_{ID}^{TX}) \quad (18)$$

$$C=f(N_{ID}^{Sync\_TX})+h(K,K')+g(N_{ID}^{RX}) \quad (19)$$

In Equations (18) and (19), $N_{ID}^{Sync\_TX}$ denotes the identifier of the terminal that transmits the synchronization signal for D2D communication. When the D2D communication synchronization signal is transmitted by one of the transmission and reception devices 200 or 300, $N_{ID}^{Sync\_TX}$ may be one of the identifiers of the transmission and reception devices 200 and 300. When the D2D communication synchronization signal is transmitted by the base station 110 or 120, $N_{ID}^{Sync\_TX}$ may be the identifier of the corresponding base station. At this time, the $N_{ID}^{Sync\_TX}$ may be included in the D2D communication synchronization signal.

According to an embodiment of the present invention, the $N_{ID}^{Sync\_TX}$ may be configured as a set of specific values of which one is selected by the device transmitting the synchronization signal. At this time, the $N_{ID}^{Sync\_TX}$ may be included in the D2D synchronization signal transmitted from one device to another device.

The functions $f(\cdot)$ and $g(\cdot)$ are the functions defined by Equation (2). The functions $f(\cdot)$ and $g(\cdot)$ may output the input values as-is.

Fifth Embodiment

According to a fifth embodiment of the present invention, the initial value for generating the scrambling sequence is determined with the function of at least one of the identifier of the transmission device transmitting unicast data, the identifier of the transmission device transmitting multicast data, or the identifier predefined for multicast data transmission.

The following description is directed to an example of generating the scrambling sequence based on the identifier of the transmission device that transmits multicast data.

More specifically, the initial value may be determined by Equation (20) below.

$$C=f(N_{ID}^{TX\_Multicast})+h(K') \quad (20)$$

In Equation (20), $N_{ID}^{TX\_Multicast}$ denotes the identifier of the device that transmits multicast data. The function $f(\cdot)$ is defined by Equation (2). The function $f(\cdot)$ may output the input values as-is. The function $f(\cdot)$ may convert the identifier of the transmission device 200 that transmits the multicast data to a multicast identifier for use in multicast.

In Equation (20), the input value K concerning the number of data code blocks is ruled out under the assumption that the spatial multiplexing is not applied in multicast data transmission, but embodiments of the present invention are not limited thereto.

According to an embodiment of the present invention, the initial value may be determined by Equation (21) in order to prevent the initial values of the scrambling sequences for the unicast and multicast data transmissions from colliding.

$$C=f(N_{ID}^{TX\_P2P})+h(K')+g(N_{ID}^{TX\_Multicast}) \quad (21)$$

Here, $N_{ID}^{TX\_P2P}$ denotes the identifier of the device transmitting unicast data, and $N_{ID}^{TX\_Multicast}$ denotes the identifier of the device transmitting multicast data.

The functions $f(\cdot)$ and $g(\cdot)$ may be defined by Equations (22) and (23) below:

$$f(x)=x \bmod m \quad (22)$$

$$g(x)=(x \bmod n)+m \quad (23)$$

In Equations (22) and (23), m denotes a number of values reserved for use as identifiers of the devices transmitting unicast data among the total number of values reserved for transmission part, and n denotes a number of values reserved for use as identifiers of the devices transmitting multicast data among the total number of values reserved for transmission part. By adjusting the values of m and n, it is possible to adjust the allocation ratio of the identifiers for use in unicast and multicast data transmissions.

Figure 3:
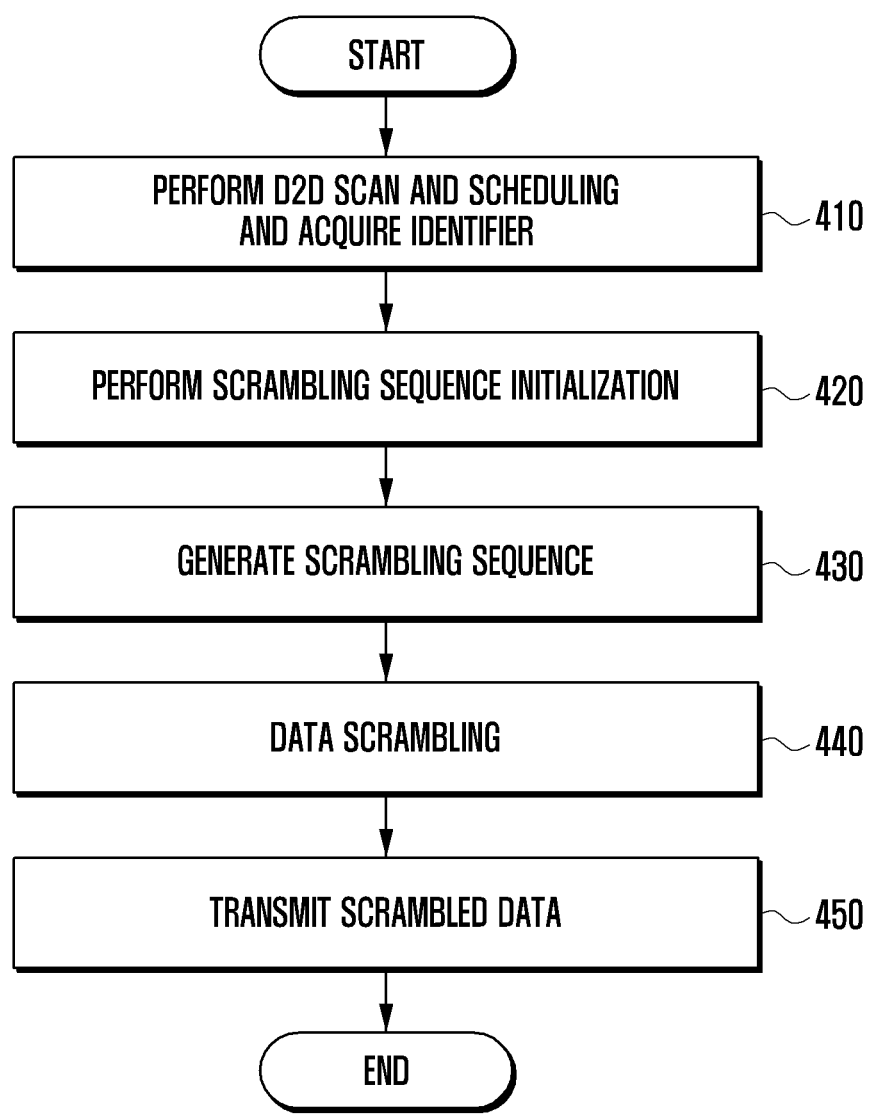
FIG. 3 is a flowchart illustrating a data transmission procedure of the transmission device according to an embodiment of the present invention.

FIG. 3 is a flowchart illustrating a data transmission procedure of a transmission device according to an embodiment of the present invention.

Referring to FIG. 3, the transmission device 200 performs discovery for D2D communication and scheduling, and acquires identifier at step 410.

The transmission device 200 performs discovery for D2D communication. The transmission device 200 broadcasts a discovery signal to provide the devices around with its information (e.g., its identifier or a value preset for scrambling sequence initialization). The transmission device 200 receives the discovery signal transmitted by another terminal to acquire the information on the nearby device (e.g., a nearby device identifier or a preset value).

Depending on the implementation, the transmission device 200 may send the base station the information on its identifier or a nearby terminal identifier and a preconfigured value.

At this time, the transmission device 200 may be in the state where synchronization with the reception device 300 for D2D communication has already been acquired.

The transmission device 200 may acquire data communication resource by performing scheduling with the counterpart terminal (e.g., reception device 300), for D2D communication based on the information acquired through the discovery process.

The transmission device 200 performs scrambling sequence initialization at step 420.

The transmission device 200 performs scrambling sequence initialization based on the information acquired in the discovery process. The transmission device 200 may determine the initial value of the scrambling sequence using the function of at least one of its own identifier, the identifier of the reception device 300, and acquired preconfigured value.

The transmission device 200 generates a scrambling sequence at step 430.

The transmission device 200 generates the scrambling sequence based on the initial value determined through the initialization.

The transmission device 200 performs data scrambling at step 440.

The transmission device 200 performs scrambling on the data to be transmitted, by generating a data bit block by encoding the data to be transmitted and performing an exclusive-or operation on the bit block of the data and the generated scrambling sequence to generate the scrambled data.

The transmission device 200 transmits the scrambled data to the reception device 300 at step 450.

The transmission device 200 sends, to the reception device 300, the data scrambled through modulation and precoding process. The transmission device 200 may transmit the data through 1:1 (i.e., unicast) communication or multicast communication with the reception device 300.

Figure 4:
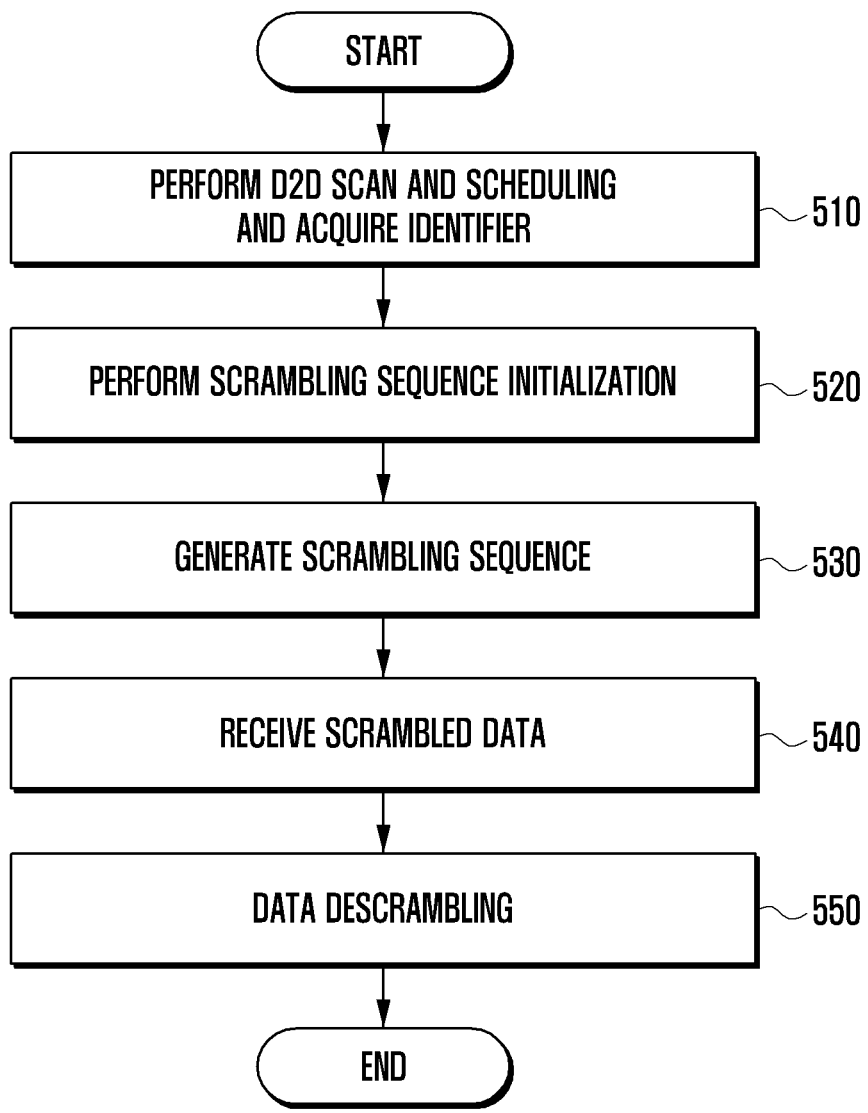
FIG. 4 is a flowchart illustrating a data reception procedure of the reception device according to an embodiment of the present invention.

FIG. 4 is a flowchart illustrating a data reception procedure of a reception device according to an embodiment of the present invention.

Referring to FIG. 4, the reception device 230 performs discovery for D2D communication and scheduling and acquires a device identifier at step 510.

The reception device 300 performs D2D discovery. The reception device 300 broadcasts the discovery signal including its own information (e.g., its own identifier or a value preconfigured for scrambling sequence initialization). The reception device 300 also receives the discovery signals transmitted by other terminals to acquire neighbor terminal information (e.g., a neighbor terminal identifier or a preconfigured value).

Depending on the implementation, the reception device 300 may transmit, to the base station, the information including at least one of its own and neighbor terminal identifiers and preconfigured value.

At this time, the reception device 300 may already be synchronized with the transmission device 200 for D2D communication.

The reception device acquires data communication resources by performing scheduling with the counterpart terminal (e.g., transmission device 200) for D2D communication.

The reception device 300 performs scrambling sequence initialization at step 520.

The reception device 300 performs scrambling sequence initialization based on the information acquired in the discovery process. The reception device 300 may determine the initial value of the scrambling sequence using a function of at least one of its own identifier, the identifier of the transmission device 200, and the preconfigured value.

The reception device 300 generates a scrambling sequence at step 530.

The reception device 300 generates the scrambling sequence based on the initial value determined through initialization. At this time, the scrambling sequence generated by the reception device 300 may be identical to the scrambling sequence used by the transmission device 200.

The reception device 300 receives the scrambled data at step 540.

The reception device 300 receives the scrambled data transmitted by the transmission device 200. When the scrambled data is modulated and/or precoded, the reception device 300 may perform demodulation and/or de-precoding on the scrambled data.

The reception device 300 performs descrambling on the scrambled data at step 550.

The reception device 300 descrambles the scrambled data by performing an exclusive-or operation on the scrambled data and the generated scrambling sequence to acquire descrambled data.

Figure 5:
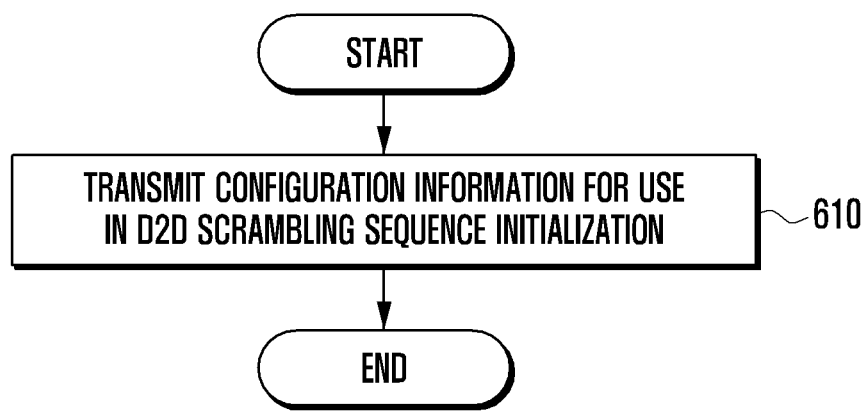
FIG. 5 is a flowchart illustrating an information transmission procedure of the base station according to an embodiment of the present invention.

FIG. 5 is a flowchart illustrating an information transmission procedure of a base station according to an embodiment of the present invention.

Referring to FIG. 5, the base station 110 or 120 transmits, to the nearby terminals, the configuration information for use in D2D communication scramble sequence initialization at step 610. The configuration information transmitted by the base station 110 or 120 includes at least one of the identifier of the transmission device 200, the identifier of the reception device 300, and the preconfigured value.

Figure 6:
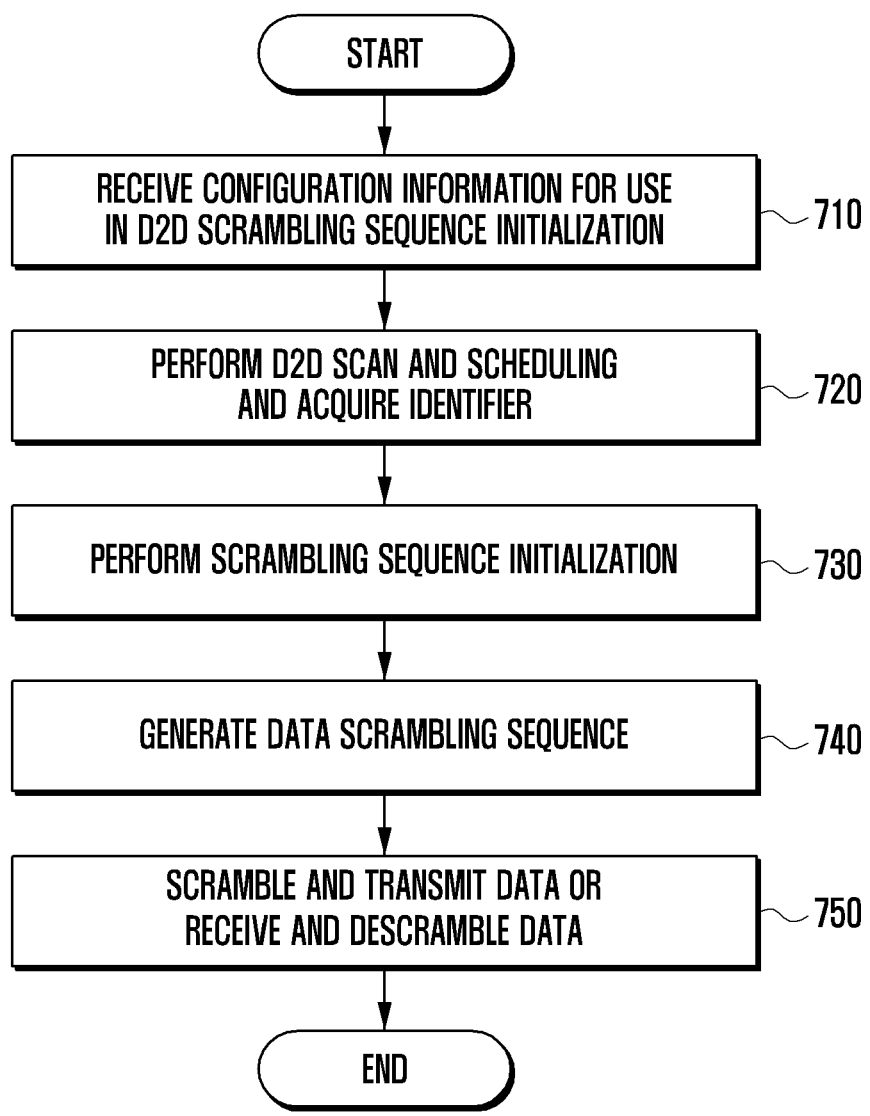
FIG. 6 is a flowchart illustrating a data communication procedure of the transmission or reception device according to an embodiment of the present invention.

FIG. 6 is a flowchart illustrating a data communication procedure of a transmission or reception device according to an embodiment of the present invention.

Referring to FIG. 6, the transmission device 200 or the reception device 300 receives the configuration information for use in D2D communication scrambling sequence initialization at step 710.

The transmission device 200 or the reception device 300 receives the configuration information for use in scrambling sequence initialization from the base station 110 or 120. The configuration information includes at least one of identifiers and a preconfigured value.

The transmission device 200 or the reception device 300 performs D2D communication discovery and scheduling and acquires identifiers at step 720.

The transmission device 200 or the reception device 300 broadcasts the discovery signal to provide the nearby terminals with its own information (e.g., its identifier). The transmission device 200 or the reception device 300 receives the discovery signal from another terminal to acquire the nearby terminal information, e.g. nearby terminal identifier.

At this time, the transmission device 200 or the reception device 300 may be synchronized for D2D communication.

The transmission device 200 or the reception device 300 performs scheduling with the D2D communication counterpart terminal based on the information acquired in the discovery process to acquire data communication resource.

The transmission device 200 or the reception device 300 performs scrambling sequence initialization at step 730.

The transmission device 200 or the reception device 300 performs scrambling sequence initialization based on the configuration information acquired from the base station and the information acquired in the discovery process. The transmission device 200 or the reception device 300 determines the initial value of the scrambling sequence using a function of at least one of its own identifier, the identifier of the counterpart device, and a preconfigured value.

The transmission device 200 or the reception device 300 generates a scrambling sequence at step 740.

The transmission device 200 or the reception device 300 generates the scrambling sequence based on the initial value determined through initialization.

The transmission device 200 or the reception device 300 performs scrambling and data transmission or data reception and descrambling at step 750.

When the method of FIG. 6 is performed by the transmission device 200, the transmission device 200 performs scrambling on the data bit block to be transmitted with the generated scrambling sequence and transmits the scrambled data to the reception device 300.

When the method of FIG. 6 is performed by the reception device 300, the reception device 30 receives the scrambled data and performs descrambling on the scrambled data with the generated scrambling sequence to acquire the descrambled data.

Figure 7:
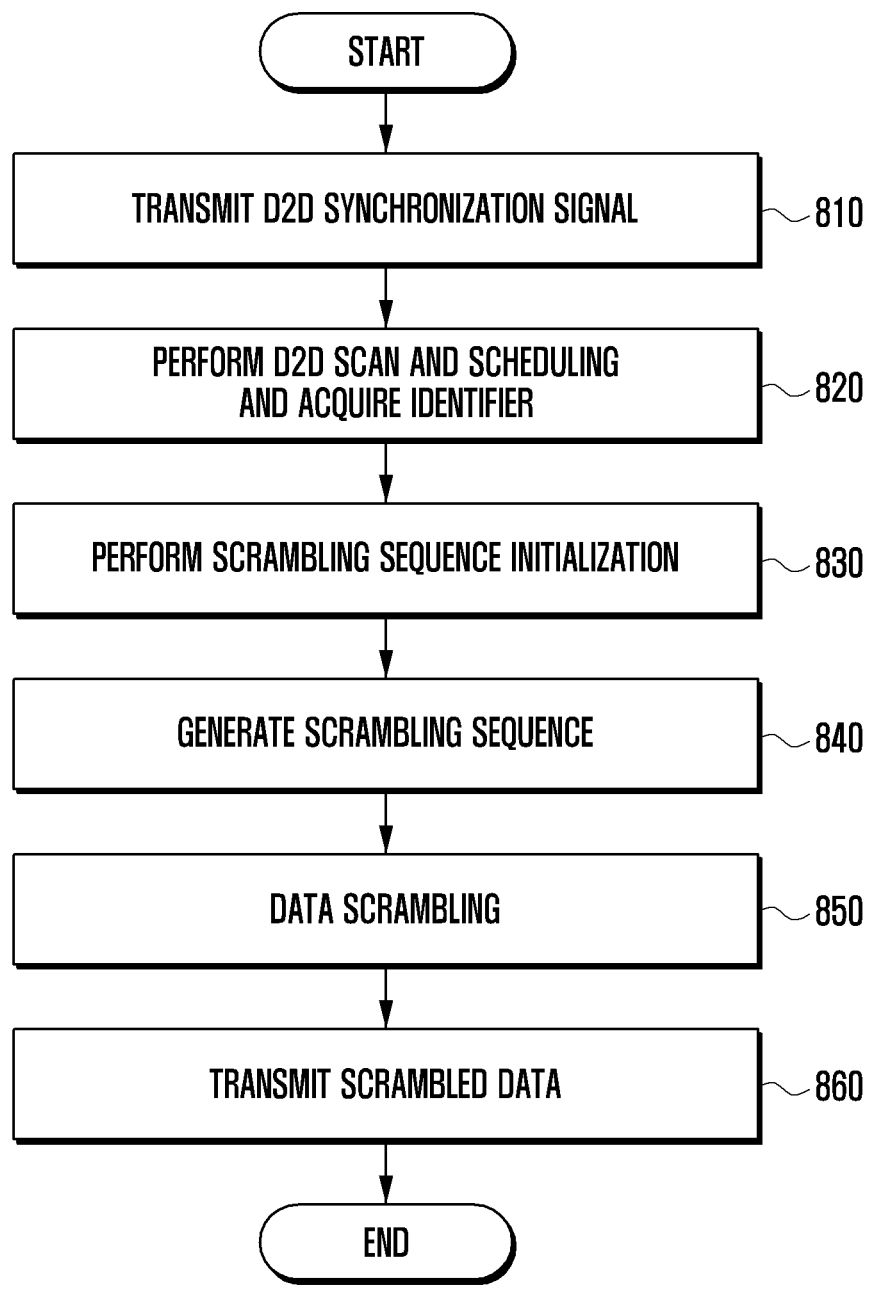
FIG. 7 is a flowchart illustrating a data transmission procedure of the transmission device according to another embodiment of the present invention.

FIG. 7 is a flowchart illustrating a data transmission procedure of a transmission device according to another embodiment of the present invention.

Referring to FIG. 7, the transmission device 200 transmits D2D communication synchronization signal at step 810.

The transmission device 200 transmits the synchronization signal to the reception device 300. The synchronization signal caries the information for use in scrambling sequence initialization and includes at least one of the identifier of the device transmitting the synchronization signal (i.e., the identifier of the transmission device 200 and the preconfigured value). The transmission device 200 may perform synchronization with the reception device 300 for D2D communication using the synchronization signal.

The transmission device 200 performs D2D communication discovery and scheduling and acquires device identifiers at step 820.

The transmission device 200 performs D2D communication discovery. The transmission device 200 broadcasts the discovery signal to provide nearby terminals with its own information (e.g., its identifier or the value preconfigured for scrambling sequence initialization). The transmission device 200 receives the discovery signal from other terminal to acquire information regarding the nearby terminals (e.g., identifiers of the nearby terminals and the preconfigured value).

The transmission device 200 performs scheduling with the D2D communication counterpart terminal (e.g., the reception device 300) based on the information acquired in the discovery process to acquire data communication resource.

Depending on the implementation, the transmission device 200 may send the base station the information used in synchronization signal transmission and discovery process. The information transmitted to the base station may include the identifiers of the transmission and reception devices 200 and 300 and the preconfigured value.

The transmission device 200 performs scrambling sequence initialization at step 830.

The transmission device 200 performs the scrambling sequence initialization based on the information acquired in the synchronization signal and the information acquired in the discovery process. The transmission device 200 determines the initial value of the scrambling sequence using the function of at least one of its own identifier, the identifier of the reception device 300, and the preconfigured value. The transmission device 200 may also determine the initial value using the identifier of the devices that transmit the synchronization signal.

The transmission device 200 generates a scrambling sequence at step 840.

The transmission device 200 generates the scrambling sequence based on the initial value determined through initialization.

The transmission device 200 performs data scrambling at step 850.

The transmission device 200 performs scrambling on the data to be transmitted by encoding the transmission into a data bit block, and performing an exclusive-or operation on the data bit block with the generated scrambling sequence to generate the scrambled data.

The transmission device 200 transmits the scrambled data to the reception device 300 at step 860.

The transmission device 200 sends the reception device 300 the scrambled data through modulation and precoding process. The transmission device 200 may transmit the data through 1:1 or multicast communication with the reception device 300.

Figure 8:
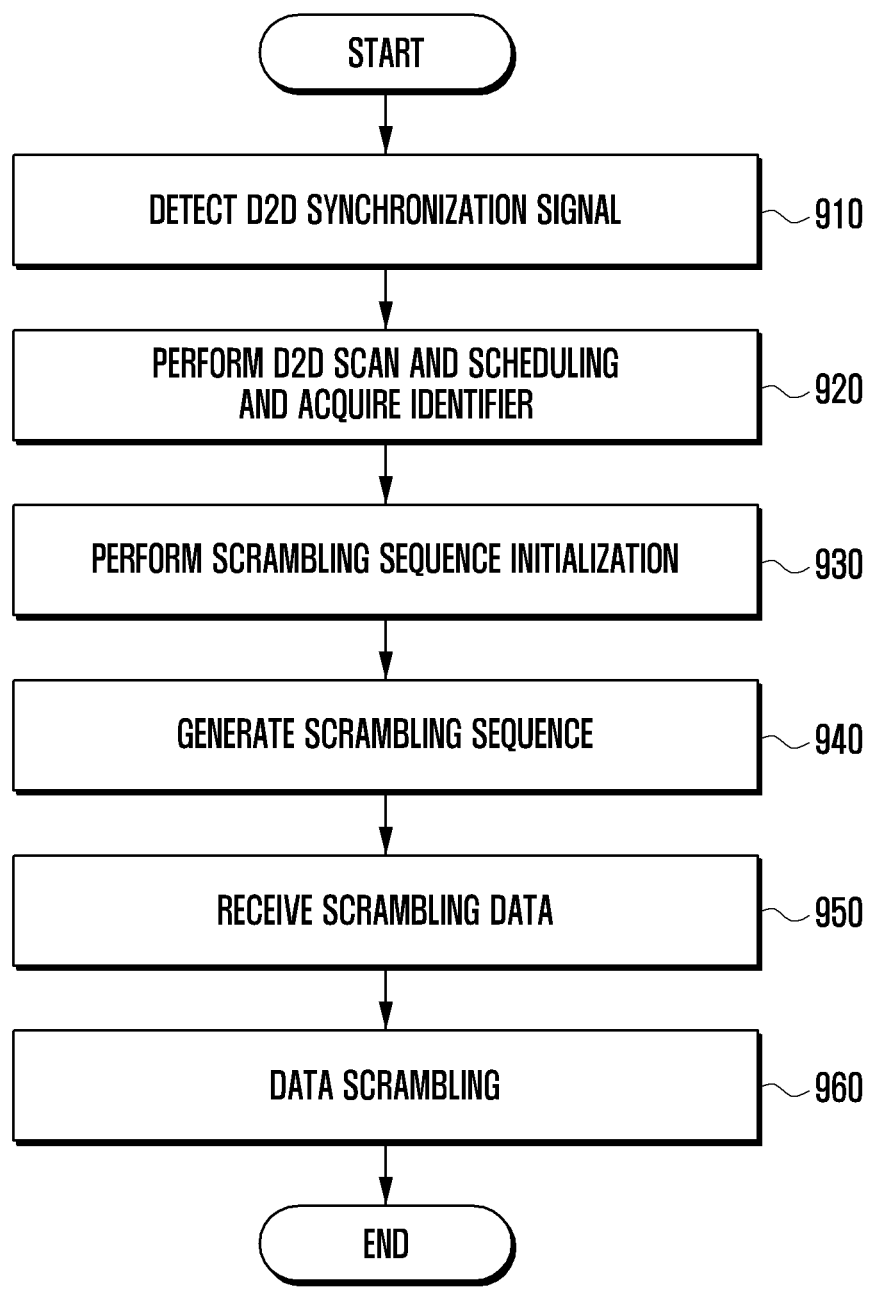
FIG. 8 is a flowchart illustrating a data reception procedure of the reception device according to an embodiment of the present invention.

FIG. 8 is a flowchart illustrating a data reception procedure of a reception device according to an embodiment of the present invention.

Referring to FIG. 8, the reception device 300 detects a D2D communication synchronization signal at step 910.

The reception device 300 detects the synchronization signal transmitted by another device. According to an embodiment of the present invention, the device that transmits the synchronization signal is the transmission device 200. The synchronization signal carries the information for used in initializing the scrambling signal and may include at least one of the identifier of the device that transmits the synchronization signal (e.g., the identifier of the transmission device 200) and a preconfigured value. The reception device 300 also may perform synchronization for D2D communication with the transmission device 200 using the synchronization signal.

The reception device 300 performs D2D communication discovery and scheduling and acquires identifiers at step 920.

The reception device 300 performs D2D communication discovery. The reception device 300 broadcasts the discovery signal including its own information (e.g., its own identifier or a value preconfigured for scrambling sequence initialization). The reception device 300 also receives the discovery signals transmitted by other terminals to acquire neighbor terminal information (e.g., a neighbor terminal identifier or a preconfigured value).

The reception device 300 performs scheduling with the counterpart terminal for D2D communication (e.g., the transmission terminal 200) based on the information acquired in the discovery process to acquire data communication resource.

Depending on the implementation, the reception device 300 may transmit, to the base station, the information including at least one of its own and neighbor terminal identifiers and a preconfigured value.

The reception device 300 performs scrambling sequence initialization at step 930.

The reception device 300 performs scrambling sequence initialization based on the information acquired from the synchronization signal and the information acquired in the discovery process. The reception device 300 may determine the initial value of the scrambling sequence using the function of at least one of its own identifier, the identifier of the transmission device 200, and the preconfigured value. The reception device 300 also may determine the initial value using the identifier of the device that transmits the synchronization signal.

The reception device 300 generates a scrambling sequence at step 940.

The reception device 300 generates the scrambling sequence based on the initial value determined in the initial process. At this time, the scrambling sequence generated by the reception device 300 may be identical to the scrambling sequence used by the transmission device 200.

The reception device receives the scrambled data at step 950.

The reception device 300 receives the scrambled data transmitted by the transmission device 200. When the data has been scrambled after modulation and/or preceding process, the reception device 300 performs demodulation and/or de-recoding on the received data.

The reception device 300 performs descrambling at step 960.

The reception device 300 performs descrambling on the scrambled data. The reception device 300 performs an exclusive-or operation on the scrambled data with the generated scrambling sequence to acquire the unscrambled data.

Figure 9:
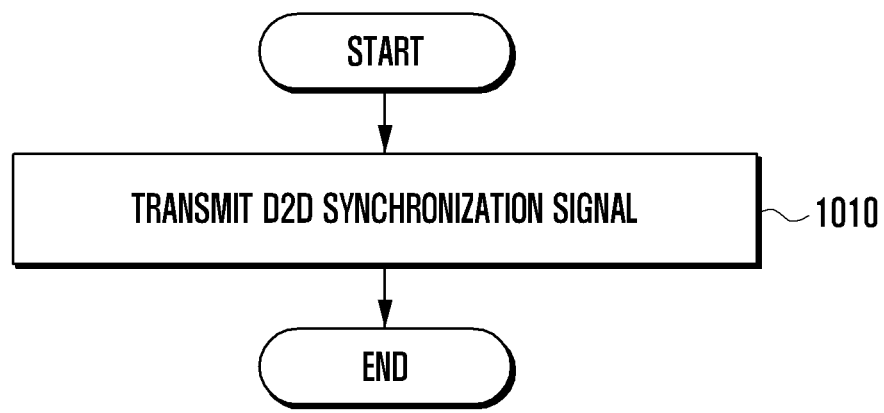
FIG. 9 is a flowchart illustrating a D2D synchronization transmission procedure of the base station according to another embodiment of the present invention.

FIG. 9 is a flowchart illustrating a D2D synchronization transmission procedure of the base station according to another embodiment of the present invention.

Referring to FIG. 9, the base station 110 or 120 transmits the D2D communication synchronization signal at step 1010.

The synchronization signal carries the information for use in scrambling sequence initialization and may include at least one of the identifier of the device that transmits the synchronization signal (i.e., the first base station 110 or the second base station 120) and the preconfigured value.

Figure 10:
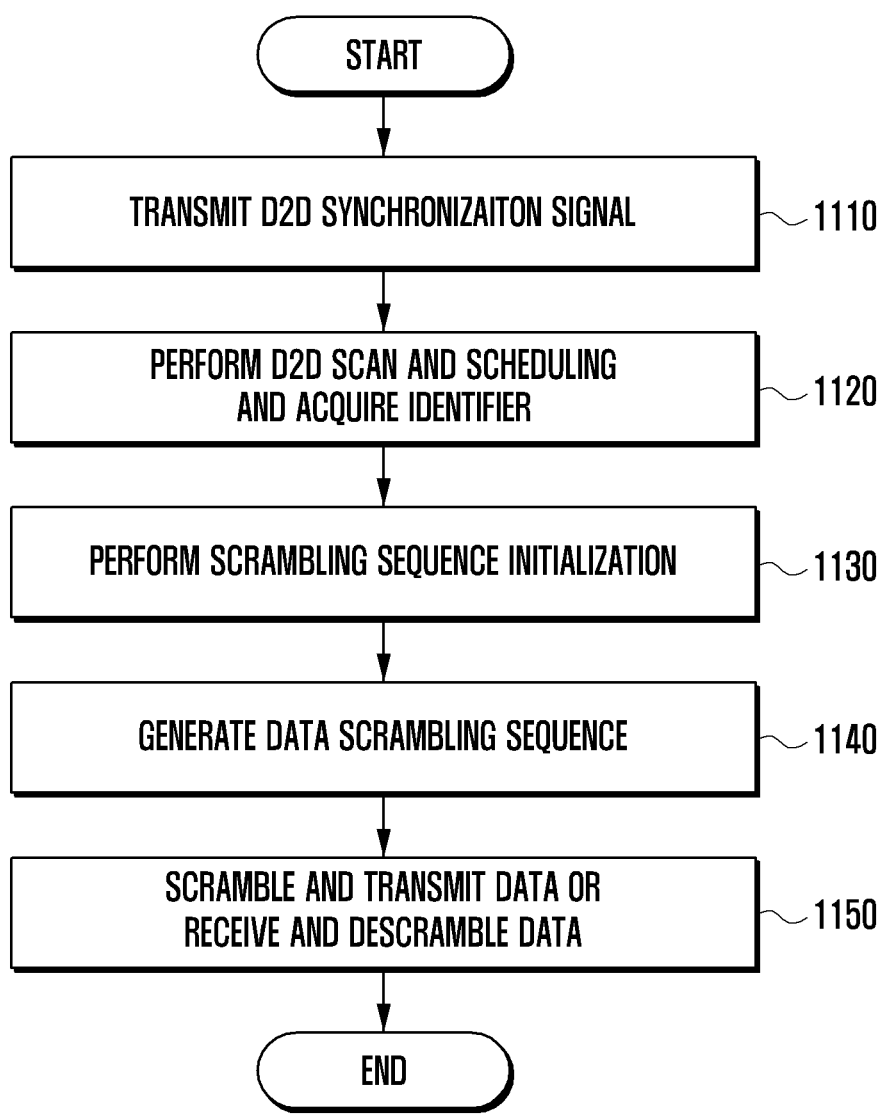
FIG. 10 is a flowchart illustrating a data communication procedure of the transmission or reception device according to another embodiment of the present invention.

FIG. 10 is a flowchart illustrating a data communication procedure of the transmission or reception device according to another embodiment of the present invention.

Referring to FIG. 10, the transmission device 200 or the reception device 300 receives a D2D communication synchronization signal at step 1110.

The synchronization signal may be transmitted by the first base station 110 or the second base station 120. The synchronization signal carries the information for use in scrambling sequence initialization and may include at least one of the identifier of the device transmitting the synchronization signal (i.e., the first base station 110 or the second base station 120) and the preconfigured value. The transmission device 200 or the reception device 300 may perform synchronization for D2D communication using the detected synchronization signal.

The transmission device 200 or the reception device 300 performs D2D discovery and scheduling and acquires identifiers at step 1120.

The transmission device 200 or the reception device 300 broadcasts the discovery signal to provide the neighbor terminals with its own information (e.g. its identifier). The transmission device 200 or the reception device 300 receives the discovery signal transmitted by another device to acquire the nearby device information (e.g. an identifier of the nearby device).

The transmission device 200 or the reception device 300 performs scheduling with the counterpart terminal of the D2D communication based on the information acquired in the discovery process to acquire data communication resource.

The transmission device 200 or the reception device 300 performs scrambling sequence initialization at step 1130.

The transmission device 200 or the reception device 300 performs scrambling sequence initialization based on the information acquired from the synchronization information and the information acquired in the discovery process. The transmission device 200 or the reception device 300 determines the initial value of the scrambling sequence using the function of at least one of its own identifier, the counterpart device identifier, and the preconfigured value.

The transmission device 200 or the reception device 300 generates a scrambling sequence at step 1140.

The transmission device 200 or the reception device 300 generates the scrambling sequence based on the initial value determined in the initialization process.

The transmission device 200 or the reception device 300 performs scrambling on the data and transmits the scrambled data or receives data and performs descrambling on the data at step 1150.

When the method of FIG. 10 is performed by the transmission device 200, the transmission device 200 scrambles the bit block of the data to be transmitted with the generated scrambling sequence and transmits the scrambled data to the reception device 300.

When the method of FIG. 10 is performed by the reception device 300, the reception device receives the scrambled data and descrambles the scrambled data with the generated scrambling sequence to acquire the transmitted data.

According to an embodiment of the present invention of the present invention, the D2D-enabled device acquires at least one of a group identifier of the service group to which it belongs and an identifier of a task group to which it belongs, determines the initial value of scrambling sequence for D2D communication based on at least one of the acquired identifiers, and generates a scrambling sequence using the initial value.

The D2D-enabled device may acquire the service group identifier and the task group identifier using the D2D synchronization signal. The D2D-enabled device may map the service group identifier and the task group identifier to positions of radio resources to be used by the service group or the task group in advance so as to be aware of the position of the radio resource used by the corresponding service group or task group based on the identifier.

Here, the service group may be a group that performs D2D communication for providing a specific service, such as a police group, a firefighter group, and a government agent group. The service group identifier is a unique preconfigured value.

The task group is the group split spatially in a service group, and one service group may include one or more task groups. For example, the members of the firefighter service group may be sorted into several sub-groups for firefighting operations in the field and, if the sub-groups are dispatched to different areas in the field, the sub-groups may be referred to as task groups. The task group identifier may be selected by the user from a set of predetermined task group identifiers. In order to help the user select the task group identifier, the D2D communication-enabled device scans around for D2D communication synchronization signal periodically to notify the user of available task group identifiers that are not used by other task groups currently.

As described above, the scrambling sequence generation method and apparatus of an embodiment of the present invention provides and initial value generation function suitable for use in D2D communication environment so as to facilitate generating scrambling sequence for D2D communication.

Also, the scrambling sequence generation method and apparatus of an embodiment of the present invention for use in D2D communication is advantageous in obtaining the scrambling-based interference randomization effect with no extra signaling overhead.

While the present invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for transmitting signals of a device supporting Device-to-Device communication, the method comprising:
   transmitting first information scrambled using a first scrambling sequence based on a predetermined value on a first channel by a first device to a second device; and
   transmitting second information scrambled using a second scrambling sequence based on a group identifier on a second channel by the first device to the second device, and
   wherein the predetermined value is an integer from 504 to 511.

2. The method of claim 1, further comprising:
   encoding the first information into a first bit block;
   generating the first scrambling sequence based on an initial value corresponding to the predetermined value;
   performing an exclusive-or operation on the first bit block with the first scrambling sequence to scramble the first bit block; and
   performing a modulation on the scrambled first bit block.

3. The method of claim 1, further comprising:
   encoding the second information into a second data bit block;
   generating the second scrambling sequence based on an initial value corresponding to the group identifier;
   performing an exclusive-or operation on the second data bit block with the second scrambling sequence to scramble the second data bit block; and
   performing a modulation on the scrambled second data bit block.

4. The method of claim 1, wherein the first information comprises scheduling information associated with the second information.

5. The method of claim 1, further comprising:
   receiving the group identifier indicating a device group supporting Device-to-Device communication for a specific service from a base station.

6. A method for receiving signals of a device supporting Device-to-Device communication, the method comprising:
   receiving first information scrambled using a first scrambling sequence based on a predetermined value on a first channel by a second device from a first device; and
   receiving second information scrambled using a second scrambling sequence based on a group identifier on a second channel by the second device from the first device, and
   wherein the predetermined value is an integer from 504 to 511.

7. The method of claim 6, further comprising:
   performing a demodulation of the scrambled first information into a first bit block;
   generating the first scrambling sequence based on an initial value corresponding to the predetermined value;
   performing an exclusive-or operation on the first bit block with the first scrambling sequence to descramble the first bit block; and
   decoding the descrambled first bit block.

8. The method of claim 6, further comprising:
   performing a demodulation of the scrambled second information into a second data bit block;
   generating the second scrambling sequence based on an initial value corresponding to the group identifier;
   performing an exclusive-or operation on the second data bit block with the second scrambling sequence to descramble the second data bit block; and
   decoding the descrambled second data bit block.

9. The method of claim 6, wherein the first information comprises scheduling information associated with the second information.

10. The method of claim 6, further comprising:
    receiving the group identifier indicating a device group supporting Device-to-Device communication for a specific service from a base station.

11. A transmission device for transmitting signals of a device supporting Device-to-Device communication, the device comprising:
    a communication unit configured to transmit first information scrambled using a first scrambling sequence based on a predetermined value on a first channel by a first device to a second device, and transmit second information scrambled using a second scrambling sequence based on a group identifier on a second channel by the first device to the second device, and
    wherein the predetermined value is an integer from 504 to 511.

12. The device of claim 11, further comprising:
    a coding unit configured to encode the first information into a first bit block;
    a scrambling unit configured to generate the first scrambling sequence based on an initial value corresponding to the predetermined value, and perform an exclusive-or operation on the first bit block with the first scrambling sequence to scramble the first bit block; and
    a modulating unit configured to perform a modulation on the scrambled first bit block.

13. The device of claim 11, further comprising:
    a coding unit configured to encode the second information into a second data bit block;
    a scrambling unit configured to generate the second scrambling sequence based on an initial value corresponding to the group identifier, and perform an exclusive-or operation on the second data bit block with the second scrambling sequence to scramble the second data bit block; and
    a modulating unit configured to perform a modulation on the scrambled second data bit block.

14. The device of claim 11, wherein the first information comprises scheduling information associated with the second information.

15. The device of claim 11, wherein a communication unit further receives the group identifier indicating a device group supporting Device-to-Device communication for a specific service.

16. A reception device for receiving signals of a device supporting Device-to-Device communication, the device comprising:
    a communication unit configured to receive first information scrambled using a first scrambling sequence based on a predetermined value on a first channel by a second device from a first device, and receive second information scrambled using a second scrambling sequence based on a group identifier on a second channel by the second device from the first device, and
    wherein the predetermined value is an integer from 504 to 511.

17. The device of claim 16, further comprising:
    a demodulation unit configured to perform a demodulation of the scrambled first information into a first bit block;
    a descrambling unit configured to generate the first scrambling sequence based on an initial value corresponding to the predetermined value, and perform an exclusive-or operation on the first bit block with the first scrambling sequence to descramble the first bit block; and a decoding unit configured to decode the descrambled first bit block.

18. The device of claim 16, further comprising:
a demodulation unit configured to perform a demodulation of the scrambled second information into a second data bit block;
a descrambling unit configured to generate the second scrambling sequence based on an initial value corresponding to the group identifier, and perform an exclusive-or operation on the second data bit block with the second scrambling sequence to descramble the second data bit block; and
a decoding unit configured to decode the descrambled second data bit block.

19. The device of claim 16, wherein the first information comprises scheduling information associated with the second information.

20. The device of claim 16, wherein a communication unit further receives the group identifier indicating a device group supporting Device-to-Device communication for a specific service.

* * * * *